(12) United States Patent
Rowland et al.

(10) Patent No.: US 7,064,337 B2
(45) Date of Patent: Jun. 20, 2006

(54) RADIATION DETECTION SYSTEM FOR PORTABLE GAMMA-RAY SPECTROSCOPY

(75) Inventors: Mark S. Rowland, Alamo, CA (US); Douglas E. Howard, Livermore, CA (US); James L. Wong, Dublin, CA (US); James L. Jessup, Tracy, CA (US); Greg M. Bianchini, Livermore, CA (US); Wayne O. Miller, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 268 days.

(21) Appl. No.: 10/410,128

(22) Filed: Apr. 8, 2003

(65) Prior Publication Data

US 2004/0217296 A1 Nov. 4, 2004

Related U.S. Application Data

(60) Provisional application No. 60/427,978, filed on Nov. 19, 2002.

(51) Int. Cl.
*G01T 1/24* (2006.01)
(52) U.S. Cl. .............................. 250/370.15; 250/370.03
(58) Field of Classification Search ........... 250/370.15, 250/370.03
See application file for complete search history.

(56) References Cited

U.S. PATENT DOCUMENTS

| 4,423,605 | A | | 1/1984 | Petrick et al. | |
|---|---|---|---|---|---|
| 4,550,381 | A | | 10/1985 | Waechter et al. | |
| 4,851,684 | A | * | 7/1989 | Martin et al. ............... | 250/352 |
| 4,893,017 | A | | 1/1990 | Kronenberg | |
| 5,068,883 | A | | 11/1991 | DeHann | |
| 5,374,827 | A | * | 12/1994 | Roy ........................... | 250/397 |
| 5,412,951 | A | * | 5/1995 | Wu ................................. | 62/6 |
| 5,446,288 | A | | 8/1995 | Tumer | |
| 5,557,108 | A | | 9/1996 | Tumer | |
| 5,646,407 | A | * | 7/1997 | Berst et al. ............ | 250/370.15 |
| 5,811,816 | A | * | 9/1998 | Gallagher et al. ..... | 250/370.15 |

(Continued)

FOREIGN PATENT DOCUMENTS

WO      WO97/11389      3/1997

(Continued)

OTHER PUBLICATIONS

Kondrashov, V. et al, Portable Spectrometer Based on Segmented HPGe Detector with Background Suppression, 2001 IEEE Nuclear Science Symposium Conf. Record.

(Continued)

*Primary Examiner*—David Porta
*Assistant Examiner*—Christine Sung
(74) *Attorney, Agent, or Firm*—James S. Tak; Alan H. Thompson (57) ABSTRACT

A portable gamma ray detection apparatus having a gamma ray detector encapsulated by a compact isolation structure having at least two volumetrically-nested enclosures where at least one is a thermal shield. The enclosures are suspension-mounted to each other to successively encapsulate the detector without structural penetrations through the thermal shields. A low power cooler is also provided capable of cooling the detector to cryogenic temperatures without consuming cryogens, due to the heat load reduction by the isolation structure and the reduction in the power requirements of the cooler. The apparatus also includes a lightweight portable power source for supplying power to the apparatus, including to the cooler and the processing means, and reducing the weight of the apparatus to enable handheld operation or toting on a user's person.

48 Claims, 5 Drawing Sheets

U.S. PATENT DOCUMENTS

| | | |
|---|---|---|
| 6,275,563 B1 | 8/2001 | Griffin, Jr. |
| 6,380,544 B1 * | 4/2002 | Broerman .............. 250/370.15 |
| 6,396,061 B1 | 5/2002 | Madden et al. |
| 2002/0086356 A1 | 7/2002 | Tuschi et al. |
| 2004/0164250 A1 * | 8/2004 | Cork et al. ............ 250/390.06 |

FOREIGN PATENT DOCUMENTS

| | | |
|---|---|---|
| WO | WO 02/44321 A2 | 6/2002 |

OTHER PUBLICATIONS

Pauly, S.W., Development of a Shaping Amplifier, Gated Integrator and 16K Channel ADC for a portable Spectroscopy System, Nuclear Instruments & Methods InPhysics Research.

Chung Chien et al, In situ rapid quantitative determination of gaseous radionuclides released from nuclear facility II, Monthly Journal of Taipower's Engineering (May 1998).

Reiman, R.T., Mobile in Situ Gamma-Ray Spectroscopy System, Transactions of the American Nuclear society (1994).

Gavrilyuk, V.I. et al, Portable Spectrometer for Correlation Experiments, Instruments and Experimental Techniques (Mar.-Apr. 1987).

Wolf, M.A. et al, A New Altra Small Battery Operated Portable Multi-Channel Analyzer, IEEE Transaction on Nuclear Science (Feb. 1980).

* cited by examiner

RADIATION DETECTION SYSTEM FOR PORTABLE GAMMA-RAY SPECTROSCOPY

This application claims priority in provisional application filed on Nov. 19, 2002, entitled "Radiation Detection and Analysis Assembly for Portable Gamma-ray Spectroscopy" Ser. No. 60/427,978, by inventors Mark S. Rowland et al.

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates to radiation detection systems, and more particularly to radiation detectors having thermal isolation systems which enable electro-mechanical cooling to cryogenic temperatures without the use of liquid cryogens.

BACKGROUND OF THE INVENTION

Gamma-ray spectroscopy may be performed using a scintillator (e.g. NaI) or a diode where the gamma-ray energy response depends on the resolution of the detector. Scintillators are certain to within about 10% of the energy, and diodes to within about 0.1%. High-purity germanium (HPGe) radiation detectors are one type of diode detector known for their performance and reliability characteristics and have become a standard by which other radiation detectors are compared. HPGe detector systems have long been the standard for critical applications including uranium enrichment and plutonium isotopic analysis, among others. Combining this high performance with the additional property of high efficiency, HPGe detectors provide very high resolution radio-nuclide spectra within a minimum acquisition time. Therefore, HPGe detector systems are recognized as a basic tool for isotopic analysis.

The better diode performance, however, comes at the price of complexity. HPGe detector systems have typically required extensive support equipment, such as signal processing electronics for data acquisition (shaping amplifier, test pulser), a high voltage power supply for detector bias, a multi-channel analyzer (MCA), a computer including requisite software necessary for spectral analysis, and a continuous supply of liquid nitrogen (LN) to maintain the detector at its proper operating temperature. The requirement of liquid cryogens for cooling the diode are especially taxing on such detector systems by increasing weight and power requirements. And low noise signal processing electronics consume large amounts of power, requiring a high capacity power source. As a result, HPGe detectors have typically been utilized only in the laboratory, and not for field operation. Moreover, building a radiation detector utilizing the desirable diode detector has usually resulted in systems that are not highly portable by humans, such as handheld detectors.

In summary, what is needed is an improved radiation detection system, such as an HPGe gamma-ray detector, which addresses power requirements, weight, and other limitations traditionally present with diode detectors, to enable field portability, such as by handheld operation or toting on a user's person.

SUMMARY OF THE INVENTION

One aspect of the present invention includes a radiation detection system comprising: a radiation detector; at least two volumetrically-nested enclosures successively encapsulating the detector with adjacent enclosures suspension-mounted to each other via suspension-mounting means and at least one of the enclosures comprising a thermal shield, for thermally isolating the detector; a cooler capable of cooling the detector to cryogenic temperatures without consuming cryogens due to the heat load reduction by the enclosures and the reduction in power requirements of the cooler caused thereby; and a power source for supplying power to the system, including to the cooler.

Another aspect of the present invention includes a portable gamma ray detection apparatus comprising: a gamma ray detector; a compact isolation structure having at least two volumetrically-nested enclosures successively encapsulating the detector with adjacent enclosures suspension-mounted to each other via suspension-mounting means and at least one of the enclosures comprising a thermal shield, for thermally isolating the detector; a cooler capable of cooling the detector to cryogenic temperatures without consuming cryogens due to the heat load reduction by the isolation structure and the reduction in the power requirements of the cooler caused thereby; means for spectroscopically processing the gamma ray data and determining isotopes therefrom; and a lightweight portable power source for supplying power to the apparatus, including to the cooler and the processing means, and reducing the weight of the apparatus to enable handheld operation or toting on a user's person.

And another aspect of the present invention includes an assembly for thermally isolating a radiation detector in a radiation detection apparatus having a cooler for cooling the detector, comprising: at least two volumetrically-nested enclosures successively encapsulating the detector with adjacent enclosures suspension-mounted to each other via suspension-mounting means and at least one of the enclosures comprising a thermal shield, wherein the enclosures reduce the heat load to the detector and reduce the cooler power requirements to enable low-power mechanical cooling of the detector to cryogenic temperatures without consuming cryogens.

BRIEF DESCRIPTION OF THE DRAWINGS

The accompanying drawings, which are incorporated into and form a part of the disclosure, are as follows.

DETAILED DESCRIPTION

The present invention is directed to a radiation detection system employing a volumetrically-nested thermal isolation assembly which enables heat load reduction on a diode detector, such as a HPGe crystal. The heat load reduction in turn enables the use of a low power electromechanical cooler to provide cryogenic cooling without the use of liquid cryogens. By reducing the power requirements necessary for operation, the weight of such a system can be effectively reduced to enable hand-held or user totable battery-operation in nuclear material location, identification, and material configuration in the field.

Figure 1:
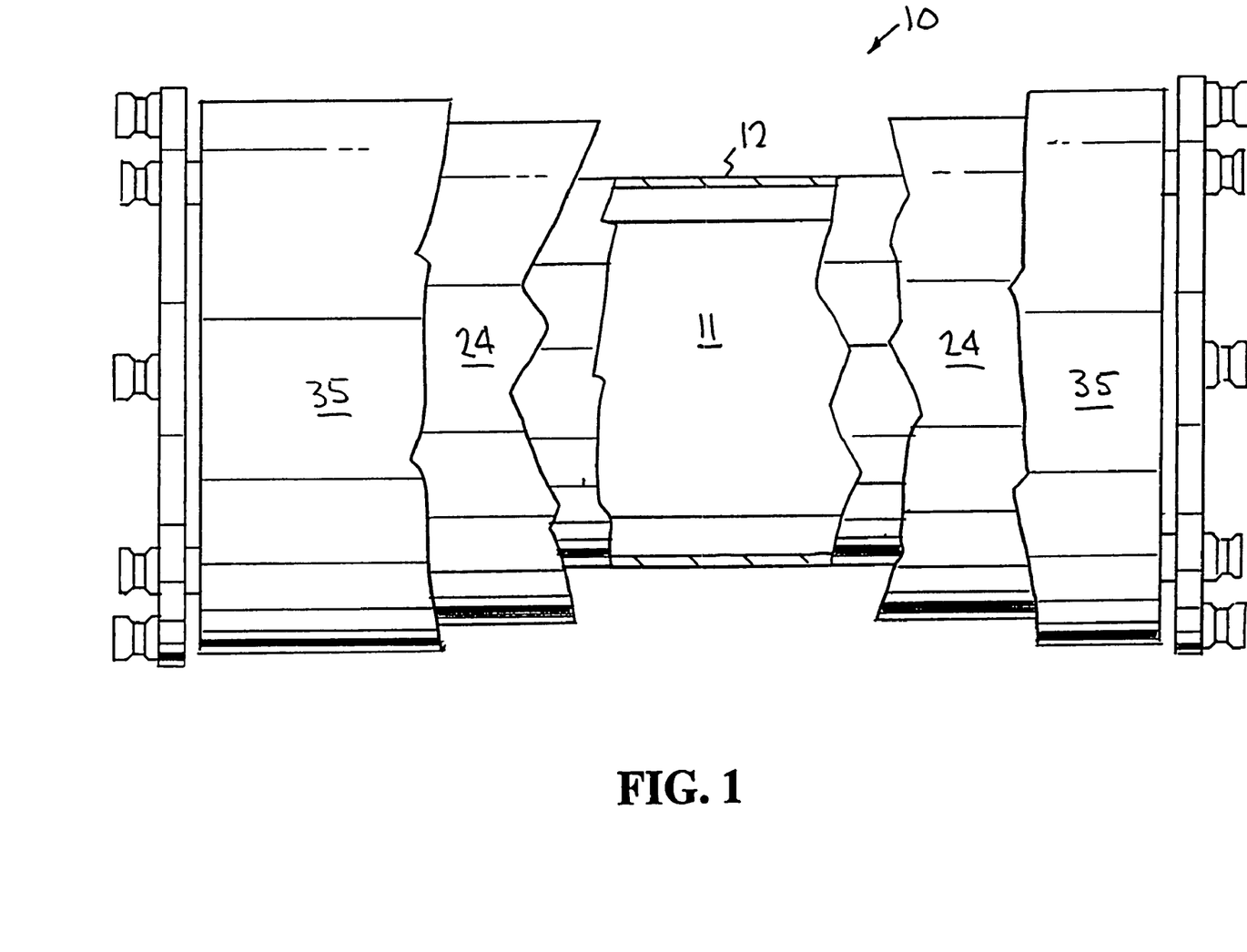
FIG. 1 is a partially broken side view of an exemplary embodiment of the thermal isolation structure of the present invention.
Figure 2:
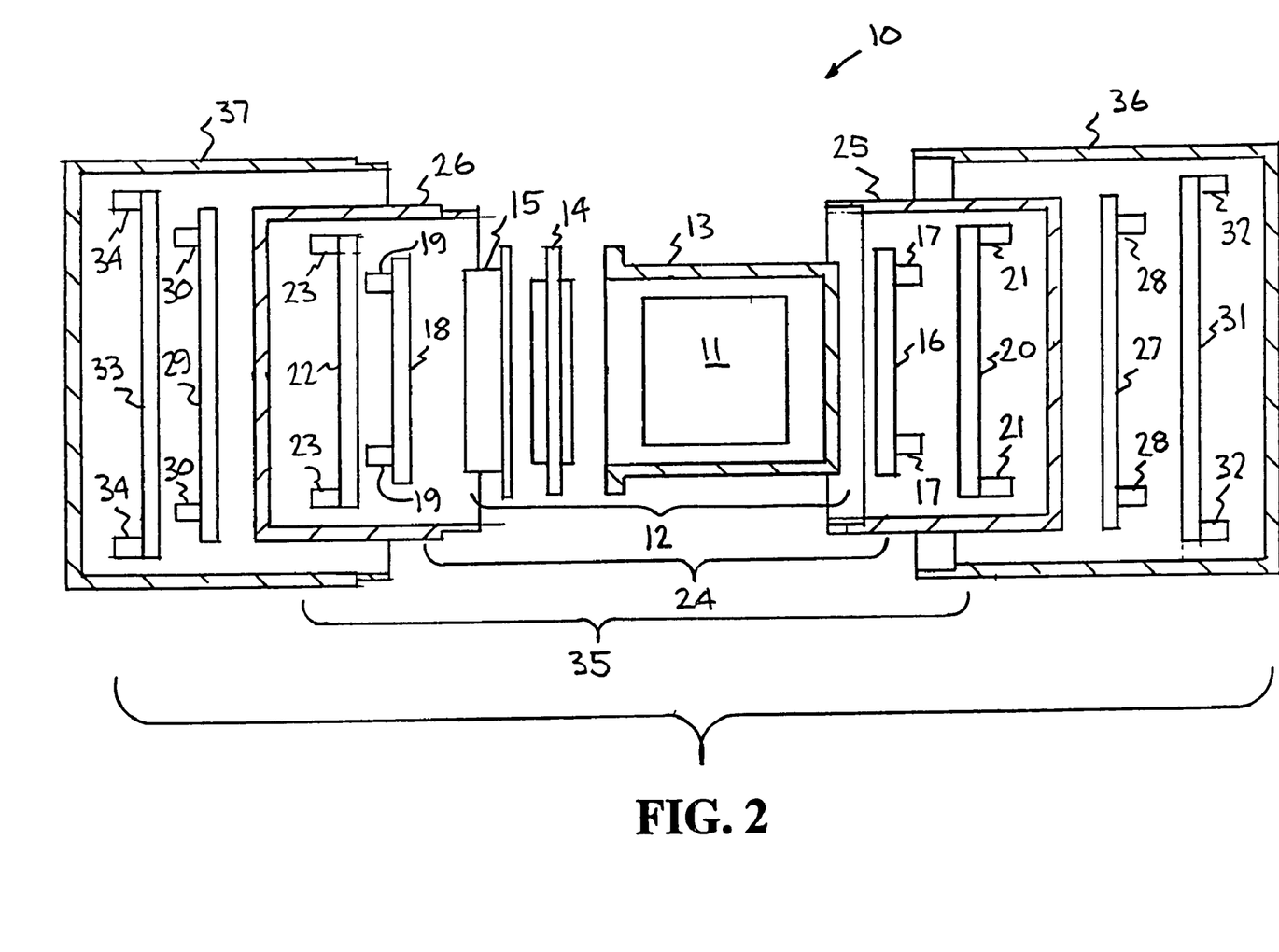
FIG. 2 is an exploded cross-sectional view of the exemplary embodiment of FIG. 1 illustrating the assembly of the volumetrically-nested arrangement of successive enclosures and the suspension mounting therebetween

FIGS. 1 and 2 show an exemplary thermal isolation structure of the present invention, generally indicated at reference character 10, and also utilized in the radiation detection apparatus or system of the present invention. A radiation detector, such as a HPGe crystal 11 for gamma ray detection, is positioned at the core of the structure 10 within a first enclosure 12 thereof using various crystal mounting methods (not shown). For example, in one crystal mounting process, the detector crystal has a right circular configuration with chamfered edges that is held by two chamfered rings pinching opposite ends of the crystal. The crystal holder rings are thermally insulating and are captive in an enclosing can of the first enclosure such that the crystal does not touch any metal structure. Additionally, the crystal holder rings may be spring loaded for impact tolerance. Electrical contacts are made through one end of the enclosing can/first enclosure. The crystal may be an N or P type semiconductor and is electrically contacted via insulating feedthroughs. An insulating environment within the first enclosure is provided by filling the first enclosure (beyond the pinching rings) with a non-conductive gas or evacuated of any atmosphere depending on how close the crystal is to a structure that will electrically arc, to prevent arcing. A second crystal mounting process may use non-thermally-conductive setscrews to pinch the crystal sides, with the setscrews impinging on the crystal from a surrounding support structure. A still another crystal mounting method may employ building an entirely dielectric holding can (i.e. first enclosure).

The thermal isolation structure 10 shown in FIGS. 1 and 2 has a structurally-rigid construction (e.g. aluminum or other lightweight metal or alloy construction) with at least two enclosures, such as 12, 24, and 35, successively encapsulating the mounted crystal in a volumetrically-nested arrangement, i.e. each succeeding enclosure (when taken in the radially outward direction starting at the core) completely contains, encloses, and/or encapsulates the preceding enclosure within its volume. As shown in FIG. 2, each enclosure preferably includes two sections which are connectable to each other to form an enclosed volume. For convenience, each section of a connecting pair may be described as either a can section or a cap section based on a chosen order of assembly, but is not intended to limit the sections to a particular structural form or function. Thus, the first enclosure 12 includes a first can section 13, and a first cap section 15. Similarly, the second enclosure 24 includes a second can section 25 and second cap section 26, and the third enclosure 35 includes a third can section 36 and third cap section 37. The first enclosure comprising sections 13 and 15 may also enclose a base 14 therein used to support the crystal mounting discussed above. And for each enclosure, one of the sections has a first end, and the other section has a second end, with the first and second ends opposite each other when the sections are connected. As shown in the drawings, the first and second ends of all the enclosures are preferably coaxially aligned, to provide a simplified design and assembly. Furthermore, each of the enclosures may have a substantially cylindrical configuration volumetrically-nested with respect to each other in a telescoping and coaxial arrangement as shown in the drawings.

Additionally, at least one of the enclosures includes a thermal shield, i.e. a low-emissivity IR-reflecting shield, exhibiting high IR reflection properties, e.g. approximately 98% reflection of IR photons. The thermal shield may be formed by a suitable coating process which coats a highly reflective material, such as gold, on the surface of the enclosure(s). For example, in one commercially available coating process, aluminum pieces are first polished, plated with nickel (e.g. 15 microns), and then plated with gold (e.g. 75 microns) such that the surface is highly reflective.

Figure 3:
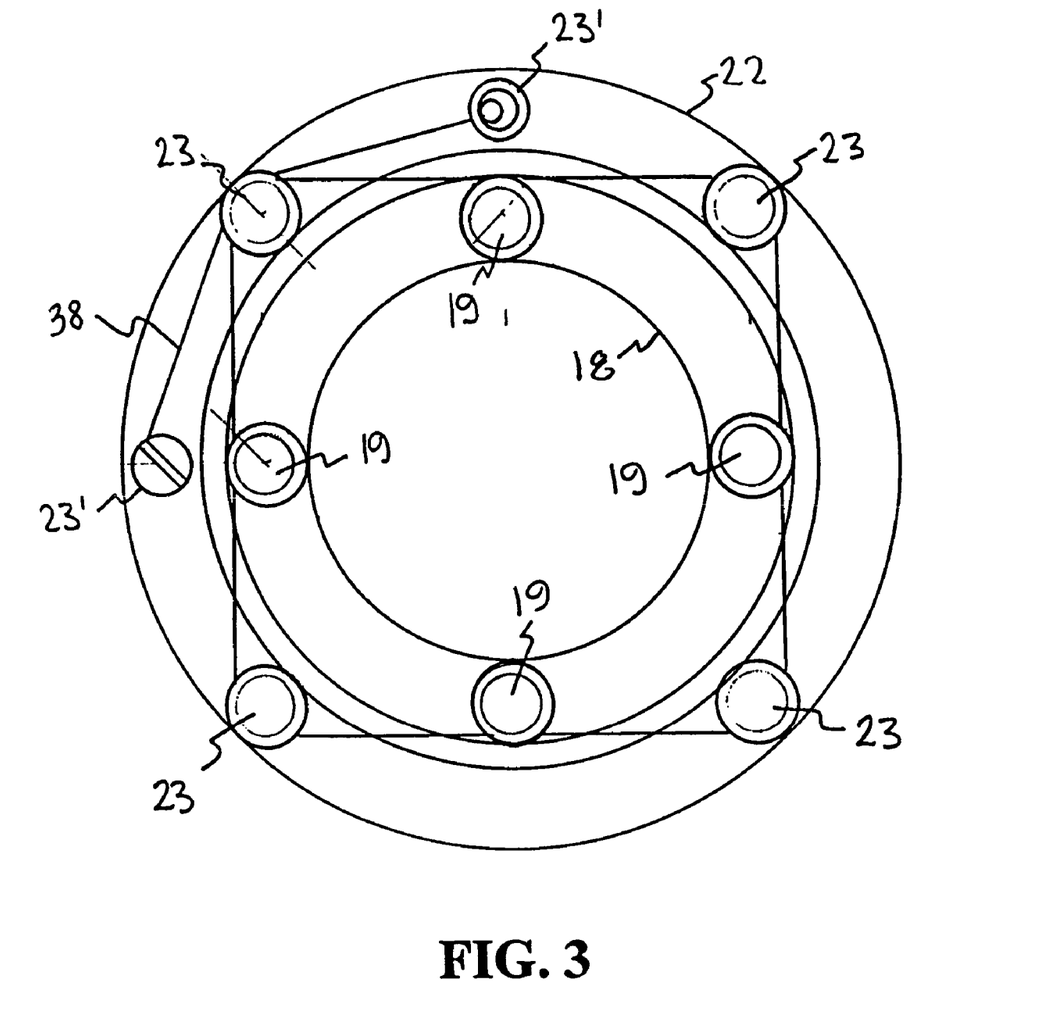
FIG. 3 is a plan view of an exemplary embodiment of the suspension-mounting means, having an inner ring and an outer ring suspended from each other via a low thermally conductive string.
Figure 4:
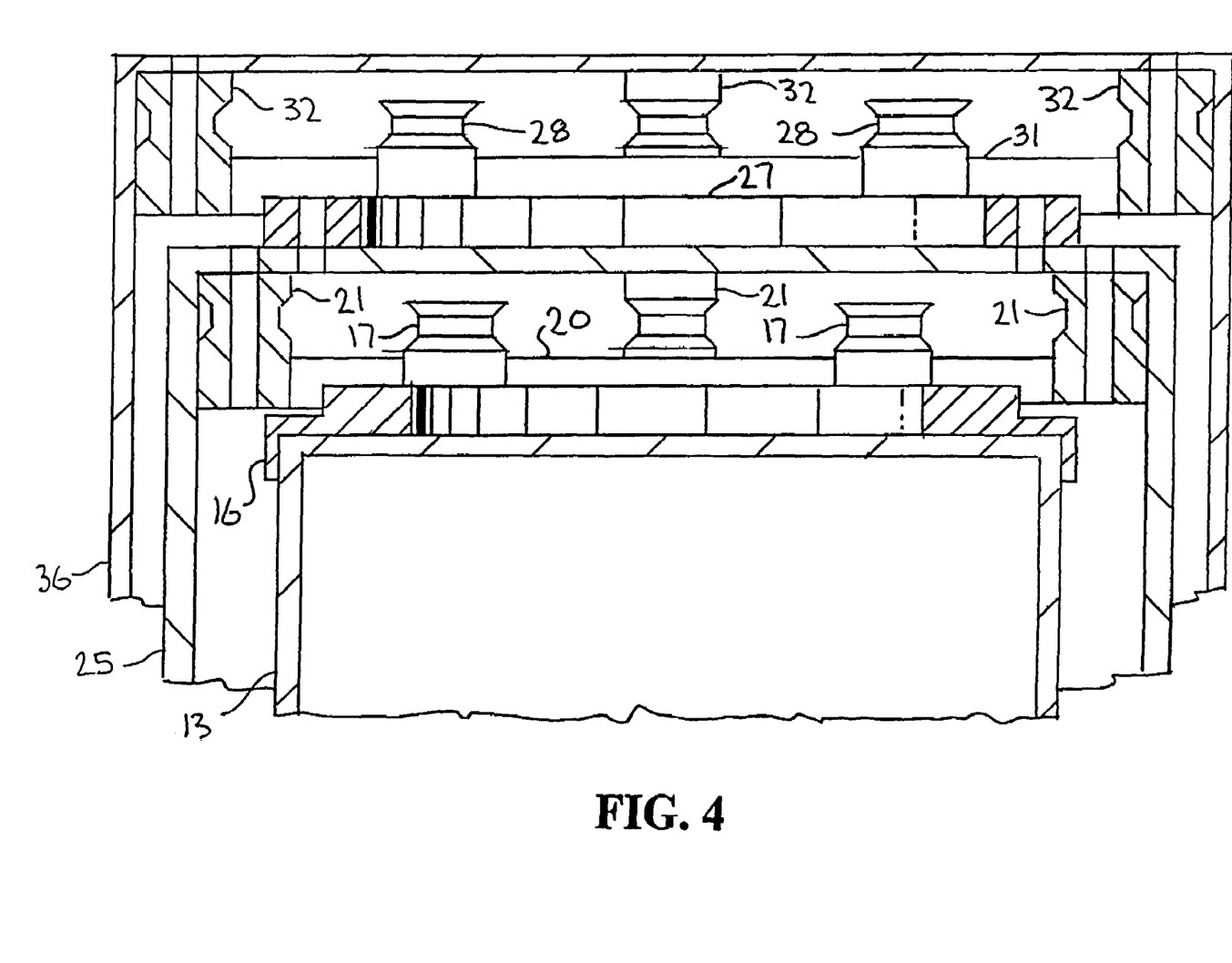
FIG. 4 is a cross-sectional view of the can section end of the thermal isolation structure shown in FIG. 2.

Adjacent enclosures (and sections) of the isolation structure are separated from and suspension mounted to each other by means of, for example, a plurality of low or non-thermally conducting lattice structures. FIG. 3 shows the details of one exemplary lattice structure comprising a pair of ring-shaped connectors, such as inner ring 18 and outer ring 22. It is notable that the terms "outer" and "inner" used to describe the rings do not refer to diameter size, rather to the relative radial position from the core. Thus while the drawings show the outer ring 22 having a greater diameter than the inner ring 18, the diameter configurations may be reversed in the alternative. In any case, the inner ring 18 includes a plurality of tie posts 19, and the outer ring 22 also includes a plurality of tie posts 23. The posts for each dual ring pair may extend in the same direction or in opposite directions. In FIGS. 2, 3 and 4, the posts at each end are shown extending in the same direction. In particular, posts 17, 21, 28, and 32 are shown extending in the same direction at one end of the isolation structure. And posts 19, 23, 30, and 34 are shown extending in the opposite direction at the opposite end of the isolation structure.

Tie downs, such as flexible stringing 38, are used to connect the posts of the outer ring to the posts of the inner ring to coaxially secure and locate the two rings with respect to each other, similar to the spokes on a bicycle wheel connecting and centrally locating the hub to the rim. A low thermal conductivity material, such as Kevlar string, may be chosen for the tie downs, and placed under tension, sewn or laced between the coaxial components. Kevlar string is an attractive choice for its low thermal conduction, low electrical conduction, and strength properties. Alternatively, other low thermal conduction materials, such as aerogel, may be utilized for the suspension-mount to tailor the heat load reduction to a cooler capacity.

The exemplary dual-ring suspension mounting lattice structure of FIG. 3 is utilized in FIG. 2 to suspension-mount all adjacent enclosures to each other whereby direct contact between adjacent enclosures is prevented. In particular, two pairs of rings are utilized to suspension-mount an enclosure from an adjacent nested enclosure at opposite ends thereof. Thus, rings 16, 20 and 18, 22 are shown utilized to suspension-mount the first enclosure 12 with the second enclosure 24, and rings 27, 31 and 29, 33 are shown utilized to suspension-mount the second enclosure 24 with the third enclosure 35. For each ring pair, an inner one of the rings is securable to an inner, diametrically smaller one of an adjacent pair of enclosures, and an outer one of the rings is securable to an outer, diametrically larger one of the same adjacent pair of enclosures. Each ring may be attached to a corresponding enclosure using, for example, conductive screws to produce a metal-to-metal connection. This manner of connection, however, does not cause a thermal shunt because thermal resistance is provided by the tie down string which connect the posts of the inner rings to the outer rings.

FIG. 4 shows a representative can section of the isolation structure illustrating the suspension-mounting described above. An inner ring, such as 16, is secured to an inner nested enclosure, e.g. the first can section 13 of the first enclosure (12 in FIG. 2). And an outer ring, such as 20, is secured to an outer nested enclosure, e.g. the second can section 25 of the second enclosure (24 in FIG. 2). The order of assembly may proceed, for example, by first attaching the inner ring 16 to the outer surface of the first can section 13, followed by using the tie downs (not shown) to sew, lace, or otherwise string the outer ring 20 thereto by means of the posts 17, 21. Next, the second layer of the isolation structure is produced by attaching the second can section 25 to the outer ring 20. In particular, the second can section 25 is shown contacting the posts 21 of the outer ring 20 for connection therewith. As an alternative method of assembly, the inner an outer rings may be pre-strung together, prior to securing to any enclosure. In this method, the combined pair of rings are attached to the inner enclosure as a unit, followed by attachment of the second enclosure thereto.

In any case, this manner of assembly may be continued for subsequent layers of the isolation structure in a building block approach to produce a multi-layer/enclosure construction for successively encapsulating the radiation detector. For example, a third layer of the isolation structure is formed in FIG. 4 by attaching an inner ring 27 to the outer surface of the second can section 25. An outer ring 31 is suspension-mounted from the inner ring 20 via tie-downs (not shown) secured around posts 28, 32. And finally a third can section 36 is positioned to contact the posts 32 of the outer ring 31 and secured thereto using, for example, screw fasteners. It is notable that three enclosure layers are shown in the drawings; however, more layers may be added in a similar manner, i.e. multiple layers may be utilized. Furthermore, the suspension-mounting of the representative can section is shown repeated in FIG. 2 for the first, second, and third cap sections 15, 26, and 37 as well, with rings 18, 22 suspension mounting the first and second cap sections, and rings 29, 33 suspension mounting the second and third cap sections. In this manner, direct contact between adjacent enclosures is avoided and a suitable spacing is maintained therebetween, while producing a rigid construction.

In this manner the enclosures may be non-contactedly suspension-mounted to each other to provide impact tolerance, and simultaneous thermal isolation. Thermal isolation is attributable to the reduction of thermal conduction combined with the operation of the IR reflecting shields. In particular, the heat load on the core radiation detector is reduced below the capacity of a cooler, where the heat load comes from (1) the spokes conducting in some heat, and (2) the material surfaces radiating some heat, making up the total heat load. Holes or other structural penetrations in the coaxial thermal shields are sources of direct heating from the outside to the cold interior. Thus, holes are minimized in the present invention to only those necessary for electrical connections (which are subsequently sealed). There are no penetrations through the thermal shields to provide structural mounting struts. This is in contrast to methods in the prior art using metal struts or Kevlar strings that directly connect the inner cold part directly to the hot outside structure. String or strut holes in the thermal shields would reduce the effectiveness of the thermal shields, such as by requiring a larger cooling pump. Thus the benefits of the IR reflector coatings are maximized in the present invention because no holes are required for the structural mounting points.

The volumetrically nested configuration of the isolation structure enables each enclosure, i.e. shield layer where coated, to incrementally reduce the IR heat loading on the core. For example, using a commercially available 300 milli-watt (heat lift) Hymatics cooler, the first shield has been shown to reduce the ultimate temperature of a 4 cm by 4 cm crystal by about 50 degrees K below the lowest attainable temperature without the shield. A second encapsulating shield has been shown to further reduce the ultimate temperature by about 35 degrees K, and a third shield further reduces the temperature by about 20 degrees K. More shielding may be utilized approaching a point of diminishing return. The substantial heat load reductions by the IR shields enables the use of a lower capacity heat-lift (e.g. 0.3 watt heat lift) pump adequate for cooling a 4×4 cm crystal to 100 K (having a cylindrical configuration with a 4 cm diameter, and 4 cm length.) Additionally, by using a higher set-point cooler, such as one having about 0.6 watts heat lift, the lift can be applied to a much larger crystal, such as a 5×7 cm crystal, which is a volume increase of about a factor of three.

Alternatively, the larger capacity 0.6 watt heat lift pump may be used to cool a smaller crystal, with the available excess capacity enabling a variety of other applications. For example, small-crystal high-resolution detectors are possible where the pumping work is a fraction of the pumps capacity, by simply turning down the pump speed and allowing microphonics to be minimized thereby. Normally the pump is run at maximum capacity which produces an inherent vibration due to the motion of the pump piston. Running the pump at a lower heat pumping rate reduces the amount of vibration. A smaller crystal detector needs less cooling power. Accordingly, by improving the heat losses (with the thermal shields), cooling may be reduced by slowing the pump speed and thereby reducing vibration. Also, vibration induces a degradation in spectroscopic resolution. Thus reducing vibration by turning down the pump is very desirable.

Another use for excess pumping capacity realized by the thermal isolation may is to cool an FET (Field Effect Transistor) that may be mounted on the cold capsule, to improve resolution. The signals from the crystal are first amplified by a transister. It is known that if this transistor is cooled, it adds less noise to the signals it amplifies. If cooling capacity were available for the FET, then higher performance detectors are possible.

A third application simply uses the large crystal to improve the sensitivity for detecting weak sources, such as those typically found in illicit trafficking. Although, use of an FET typically improves the resolution by about a factor of two, it is not always necessary to improve resolution; simply determining the presence of a hidden radiation source is all that is required. This is typically hard for a hand-held detector because lightweight typically translates to low sensitivity. The cooling capacity may be applied to cool a large crystal, without a FET, and still achieve a significant detectivity advantage over other small hand held detectors. In particular, this resolution advantage is still on the order of about a factor of about ten or more over other detectors (where typical resolution of scintillators is about 7% of the gamma-ray energy).

Implicit in this approach is that the crystal cools to operating temperature. Operating temperature is achieved without dependence on a supplemental cooler. The benefits are obviously power reductions. In comparison, HPGe detectors have almost exclusively relied upon high power cooling (e.g. liquid nitrogen, LN). Alternatively, very small crystals were used where cooling is not a big burden, or an active approach (such as shield temperature control) was used which consumes power. In comparison to the low power cooler of the present invention, LN cooling has nearly an infinite capacity to pump heat, and thus there is no need to lower the heat load from radiation. However, the power requirements of such a cooling system are very great, making it difficult to reduce the size, weight and complexity of the HPGe detector.

Figure 5:
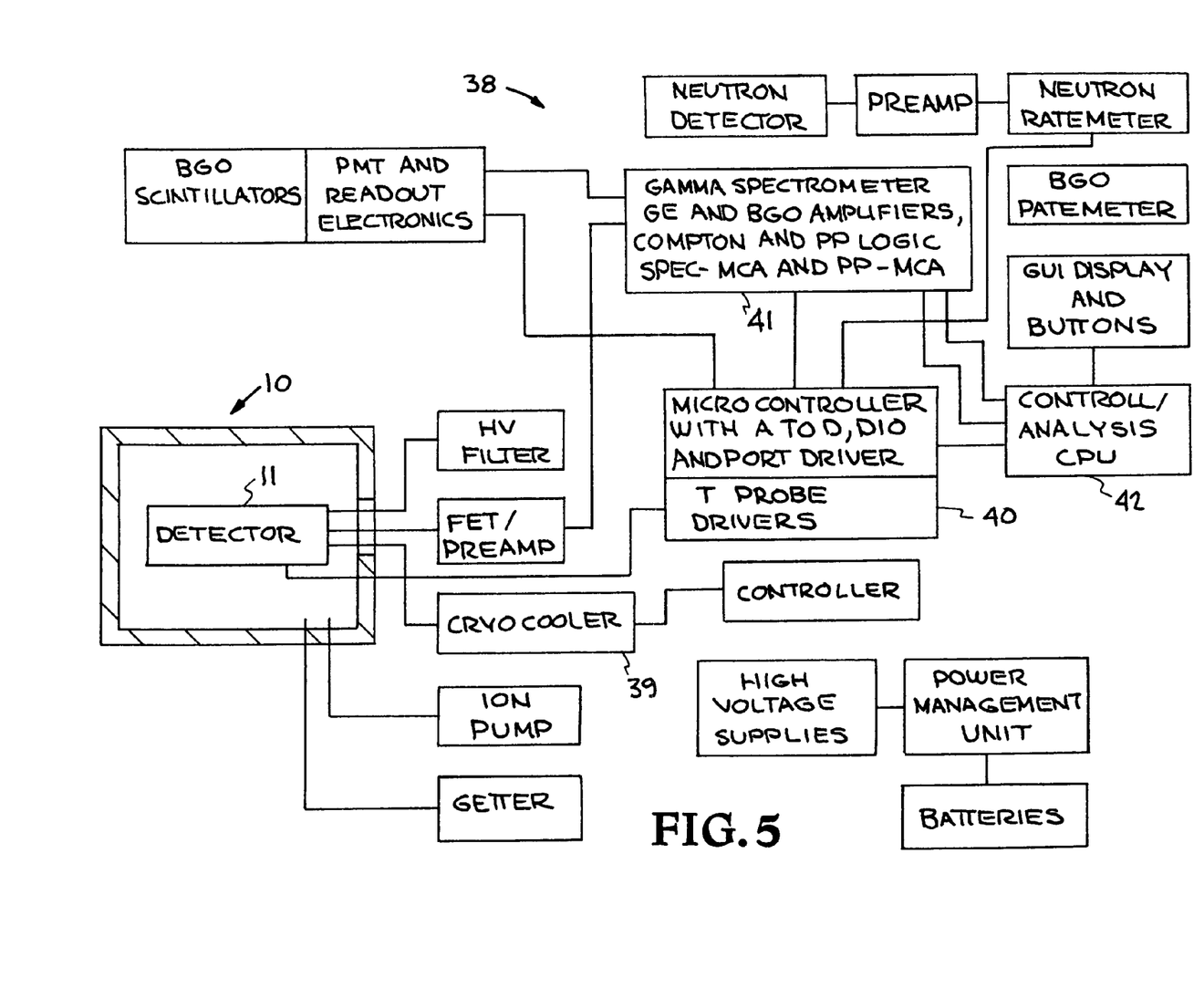
FIG. 5 is a schematic diagram of the functional components of the portable radiation detection apparatus of the present invention.

As shown in FIG. 5, the thermal isolation structure 10 is utilized in conjunction with a compactly-sized, portable radiation detection and analysis apparatus, indicated at reference character 38. Many of the functional components of the radiation detection apparatus are shown in FIG. 5, with the system being relatively small, approximately the size of a "bread box," and suitable for hand-held and/or totable operation on a user's person. In particular, integration of the thermal isolation structure 10 together with other functional components (some commercially available) enables system viability as a compact, lightweight, completely functional stand-alone unit, weighing about twenty-five pounds and suitable for toting on a user's person and handheld operation. Additionally, lightweight battery operation of the HPGe crystal and apparatus is enabled by the use of the thermal isolation system, as discussed above, due to the lower power requirements for cooling the core to cryogenic temperatures.

Enabling the system of up to about 25 pounds total weight, including batteries that power the system for about 6 hours, is basic power management combined with using small parts. The cooler pump 39 uses about ten watts. And the electronics use about four watts which powers, for example, a significantly powerful computer 42 (e.g. a 200 MHz strongarm CPU, ~100 MIPS) and other electronics, such as two low power high voltage supplies for detector bias and vacuum pumping, a multichannel analyzer (MCA), DC filtering circuits, multiple serial port connections for all system communications, an integrated power management control system, amplifiers for preparing the HPGe signal for the MCA, a Compton rejection logic circuit, amplifiers for a Compton detector, high voltage for the neutron detector, amplifiers for the neutron detector. The vacuum system consists of a getter and a miniature ion pump that uses very little current to pump gases that the getter absorbs poorly.

Power management of the system is automatic and controllable from the serial port to the PC. It provides power routing, DC levels for a variety of different parts, checks for when to charge the PC. Power may be supplied by internal batteries or from an external power source. When external power is available, it may be used to simultaneously charge batteries and power the cooler and electronics. Inputs are provided for most any power source including DC and AC, low and high voltage.

A housekeeping controller 40 in FIG. 5 provides counting functions for pulses from the HPGe, Compton, and neutron detectors, controls the HV for HPGe and vacuum system, monitors voltages and currents for vacuum system, measures temperature of the cryogenic load, monitors and adjusts the vibration inherent in the mechanical cooler, (vibration management is available via the serial port under control of the computer). The housekeeper functions to rout signals such that Compton and HPGe inputs may be internally provided to two MCA's or split the Compton rejector into two halves that can be checked for coincidence (a pair spectrometer) and/or use the Compton signal to suppress the continuum in one MCA.

Another function of the housekeeping controller 40, is that the temperature of the HPGe crystal may be monitored on a real time basis. This feature may be used to know what the energy calibration will be at all times. This is in contrast to the typical reality that any temperature changes in the crystal cause the energy calibration to change. Thus, an operator need not continually recalibrate his detector, such as when he works in the sun or as he makes measurements both indoors and out. Instead, the energy calibration is measured at temperatures that span the practical range. The computer constantly monitors, via the housekeeper, the crystal temperature, and whenever data is collected, the current calibration is used in any real time analysis, or written into the data file.

Self protection is a feature that is built into the system via the housekeeper circuit. The ion pump current is monitored and if it exceeds a preset value, the system will report an error (vacuum leak) and shut down. If the temperature of the crystal exceeds a preset maximum, the high voltage bias will be shut down, preventing damage to the crystal. Additionally, vibration control is also monitored using an accelerometer. If the signal is too high, the motor power is reduced. This can be viewed/used as microphonics control, power management, or a mechanism to identify mechanical coupling to external hard structures. The latter is a problem with the motor, where it has a resonant damper internal to it that behaves well if not coupled to external structures. When accidental coupling occurs between the detector housing and some other structure, the internal resonant damper may fail to counterbalance the motor. An internal monitor is used that notes the system vibration and adjusts the power input as specified by the computer. Computer control allows the system to run the pump motor to meet many operational objectives.

Computer software is also provided to control the user interface. Accessible by touch screen on the computer are, for example, four functions including: search, identification (ID), data collection, and view housekeeping. Search is implemented by directly reading the count rates from the N and G inputs from the housekeeper. The low efficiency N detector has a special algorithm to provide instantaneous count rate on a one second basis, and an average count rate that is based on the interval between counts. This interval monitoring is useful with low efficiency counting systems where the low efficiency would usually give a zero average, yet the real average is non zero and should be computed over a variable observation time. Without knowing what a neutron source strength will be, one cannot set an arbitrary observation time without either forcing the operator to wait too long, or missing the rare counts and reporting the wrong rate. The rate is computed based on when the counts occur rather that when the clock mandates the end of the count. This process ensures a nonzero count rate that updates at the maximum rate possible. Presentation of data may be provided by a sliding bar chart graph that slides in one-second slices across the screen. Vertical scale is a log scale where the decade changes are noted by color change in the top part of the bar. This negates the need for a scale to be placed or read by the operator. Both N and G charts are presented. The real time rates are printed on the screen. Thus, an onboard display may be utilized for displaying results obtained by the data processing means.

Generally, the identification of isotopes by the system involves a process of looking for peaks in the gamma-ray spectrum. Since the energy calibration is known, the computer knows which channels to read from the MCA. This selective read saves time, allowing a large number of peak regions to be acquired every second. Each peak region is then analyzed for statistical significance, above a linear background that is computed from three channels on each side of the region. Both the statistical significance and the attribution to an isotope is presented in a rapidly changing table of rank sorted isotopes. When specified line pairs are present in statistically significant amounts, an entry is made in the lower part of the screen, stating the ID. The top part may be, therefore, a view of the real-time growth in confidence and the bottom is the statistically significant observation (analysis). Some operators desire to see the data grow in and they obtain this from the top window. Other operators simply want the answer, which is presented in the lower window. Gamma ray lines are specified with a user edited table that allows for single, double, or triple coincidence. The statistical requirement for an ID depends on how many coincidences are entered. The more coincidence required, the lower the individual line significance is required for a detection to be made. Additional constraints on ID include peak ratios or peak-to-Compton ration. This saves count time by trading any increasing spectral uniqueness for individual peak statistical significance, automatically.

Data collection by the system involves a process where the user has a chance to collect a spectrum, look at it, and/or save it. The screen provides the plot of the full spectrum. It can be expanded for detailed examination. Linkage with the ID function is automatic in that if the user wants to know the spectrum that led to the identified isotopes, the spectrum is still in the MCA memory. The user can simply select the "get data" function and then save it. There is a clear memory button and a collect button. All of these functions have been intentionally simplified since most operators do not know how to operate an MCA. The save data button asks the user to enter the measurement distance and then the data is saved. The view housekeeping function provides a screen of numerical data that is consulted for status on the health of the entire instrument.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

What is claimed is:

1. A radiation detection system comprising:
a radiation detector;
at least two volumetrically-nested enclosures successively encapsulating the detector with adjacent enclosures suspension-mounted to each other via suspension-mounting means and at least one of the enclosures comprising a thermal shield, for thermally isolating the detector;
a cooler capable of cooling the detector to cryogenic temperatures without consuming cryogens due to the heat load reduction by the enclosures and the reduction in power requirements of the cooler caused thereby; and
a power source for supplying power to the system, including to the cooler.

2. The system of claim 1,
wherein the thermal shield comprises a low-emissivity IR reflector coating.

3. The system of claim 1,
wherein each enclosure comprises first and second sections connectable to each other to form an enclosed volume.

4. The system of claim 3,
wherein, for each enclosure, the first section has a first end and the second section has a second end opposite the first end when the sections are connected.

5. The system of claim 4,
wherein the first and second ends of the enclosures are coaxially aligned.

6. The system of claim 5,
wherein each of the enclosures have a substantially cylindrical configuration and volumetrically-nested with respect to each other in a telescoping arrangement.

7. The system of claim 5,
wherein the suspension-mounting means are located between adjacent enclosures at the first and second ends thereof.

8. The system of claim 1 or 7,
wherein the suspension-mounting means includes an inner connector connectable to an inner one of two adjacent enclosures, an outer connector connectable to an outer one of the two adjacent enclosures, and tie-downs for securing the inner connector and the outer connector in spaced relation to each other.

9. The system of claim 8,
wherein the tie-downs comprise a low thermal conductivity material.

10. The system of claim 9,
wherein the tie-downs are Kevlar string.

11. The system of claim 8,
wherein the connectors comprise a low thermal conductivity material.

12. The system of claim 8,
wherein the inner connector is integrally connected to the inner one of two adjacent enclosures.

13. The system of claim 1,
wherein the radiation detector comprises a gamma ray detector.

14. The system of claim 13,
wherein the radiation detector comprises a high purity germanium crystal.

15. The system of claim 1,
wherein the power source is a lightweight portable battery for reducing the weight of the system to enable hand-held operation or toting on a user's person.

16. The system of claim 1, further comprising:
data processing means for processing data collected by the radiation detector and determining isotopes therefrom.

17. The system of claim 16,
wherein the data processing means includes a spectrometer.

18. The system of claim 1, further comprising:
means for monitoring the temperature of the radiation detector to provide real-time energy calibration for collected radiation data, and for shutting down power to the radiation detector if the temperature exceeds a predetermined maximum to prevent damage to the radiation detector.

19. The system of claim 1, further comprising:
means for monitoring vibration levels generated by the cooler and adjusting the power of the cooler to reduce undesired resonances in the system.

20. The system of claim 1, further comprising:
means for monitoring vacuum pressure within a detector volume and shutting down the system upon detecting a vacuum leak to prevent damage to the radiation detector.

21. A portable gamma ray detection apparatus comprising:
- a gamma ray detector;
- a compact isolation structure having at least two volumetrically-nested enclosures successively encapsulating the detector with adjacent enclosures suspension-mounted to each other via suspension-mounting means and at least one of the enclosures comprising a thermal shield, for thermally isolating the detector;
- a cooler capable of cooling the detector to cryogenic temperatures without consuming cryogens due to the heat load reduction by the isolation structure and the reduction in the power requirements of the cooler caused thereby;
- means for spectroscopically processing the gamma ray data and determining isotopes therefrom; and
- a lightweight portable power source for supplying power to the apparatus, including to the cooler and the processing means, and reducing the weight of the apparatus to enable handheld operation or toting on a user's person.

22. The apparatus of claim 21,
wherein the thermal shield comprises a low-emissivity IR reflector coating.

23. The apparatus of claim 21,
wherein each enclosure comprises first and second sections connectable to each other to form an enclosed volume.

24. The apparatus of claim 23,
wherein, for each enclosure, the first section has a first end and the second section has a second end opposite the first end when the sections are connected.

25. The apparatus of claim 24,
wherein the first and second ends of the enclosures are coaxially aligned.

26. The apparatus of claim 25,
wherein each of the enclosures have a substantially cylindrical configuration and volumetrically-nested with respect to each other in a telescoping arrangement.

27. The apparatus of claim 25,
wherein the suspension-mounting means are located between adjacent enclosures at the first and second ends thereof.

28. The apparatus of claim 21 or 27,
wherein the suspension-mounting means includes an inner connector connectable to an inner one of two adjacent enclosures, an outer connector connectable to an outer one of the two adjacent enclosures, and tie-downs for securing the inner connector and the outer connector in spaced relation to each other.

29. The apparatus of claim 28,
wherein the tie-downs comprise a low thermal conductivity material.

30. The apparatus of claim 29,
wherein the tie-downs are Kevlar string.

31. The apparatus of claim 28,
wherein the connectors comprise a low thermal conductivity material.

32. The apparatus of claim 28,
wherein the inner connector is integrally connected to the inner one of two adjacent enclosures.

33. The apparatus of claim 21,
wherein the detector comprises a high purity germanium crystal.

34. The apparatus of claim 21, further comprising:
means for monitoring the temperature of the gamma ray detector to provide real-time energy calibration for collected radiation data, and for shutting down power to the gamma ray detector if the temperature exceeds a predetermined maximum to prevent damage to the gamma ray detector.

35. The apparatus of claim 21, further comprising:
means for monitoring vibration levels generated by the cooler and adjusting the power of the cooler to reduce undesired resonances in the apparatus.

36. The apparatus of claim 21, further comprising:
means for monitoring vacuum pressure within a detector volume and shutting down the apparatus upon detecting a vacuum leak to prevent damage to the gamma ray detector.

37. An assembly for thermally isolating a radiation detector in a radiation detection apparatus having a cooler for cooling the detector, comprising:
at least two volumetrically-nested enclosures successively encapsulating the detector with adjacent enclosures suspension-mounted to each other via suspension-mounting means and at least one of the enclosures comprising a thermal shield, wherein the enclosures reduce the heat load to the detector and reduce the cooler power requirements to enable low-power mechanical cooling of the detector to cryogenic temperatures without consuming cryogens.

38. The assembly of claim 37,
wherein the thermal shield comprises a low-emissivity IR reflector coating.

39. The assembly of claim 37,
wherein each enclosure comprises first and second sections connectable to each other to form an enclosed volume.

40. The assembly of claim 39,
wherein, for each enclosure, the first section has a first end and the second section has a second end opposite the first end when the sections are connected.

41. The assembly of claim 40,
wherein the first and second ends of the enclosures are coaxially aligned.

42. The assembly of claim 41,
wherein each of the enclosures have a substantially cylindrical configuration and volumetrically-nested with respect to each other in a telescoping arrangement.

43. The assembly of claim 41,
wherein the suspension-mounting means are located between adjacent enclosures at the first and second ends thereof.

44. The assembly of claim 37 or 43,
wherein the suspension-mounting means includes an inner connector connectable to an inner one of two adjacent enclosures, an outer connector connectable to an outer one of the two adjacent enclosures, and tie-downs for securing the inner connector and the outer connector in spaced relation to each other.

45. The assembly of claim 44,
wherein the tie-downs comprise a low thermal conductivity material.

46. The assembly of claim 45,
wherein the tie-downs are Kevlar string.

47. The assembly of claim 44,
wherein the connectors comprise a low thermal conductivity material.

48. The assembly of claim 44,
wherein the inner connector is integrally connected to the inner one of two adjacent enclosures.

* * * * *